United States Patent [19]

Hillebrand et al.

[11] Patent Number: 4,624,493
[45] Date of Patent: Nov. 25, 1986

[54] SELF-RESTORING ENERGY ABSORBING BUMPER MOUNT

[75] Inventors: Donald G. Hillebrand, Lake Orion; Donald A. Mugford, East Detroit, both of Mich.

[73] Assignee: Chrysler Motors Corporation, Highland Park, Mich.

[21] Appl. No.: 781,365

[22] Filed: Sep. 30, 1985

[51] Int. Cl.⁴ .............................................. B60R 19/02
[52] U.S. Cl. .................................. 293/136; 293/137; 267/140
[58] Field of Search ............... 293/132, 134, 135, 136; 267/140, 9 C; 188/268

[56] References Cited

U.S. PATENT DOCUMENTS

| | | | |
|---|---|---|---|
| 3,715,114 | 2/1973 | Thorsby | 267/140 |
| 3,715,139 | 2/1973 | Tuggle | 293/134 |
| 3,741,560 | 6/1973 | Schaller | 267/140 |
| 3,829,142 | 8/1974 | Bommarito | 293/135 |
| 4,061,386 | 12/1977 | Chupick | 293/135 |
| 4,097,080 | 6/1978 | Petry | 293/134 |
| 4,200,318 | 4/1980 | Gute et al. | 293/136 |

*Primary Examiner*—Robert R. Song
*Attorney, Agent, or Firm*—Edward P. Barthel

[57] ABSTRACT

An energy absorbing bumper mounting arrangement including a longitudinally extending tubular member having a forward portion secured to a vehicle bumper and an aft portion slidably received in a circular opening formed in a vehicle frame portion. A cylindrical capsule of thermoplastic polyester elastomer material has a central passage telescopically receiving the tubular member aft portion. Abutment means fixed on the tubular member engages an intermediate frame wall preventing its forward travel. A preloaded coil spring is concentrically disposed about the tubular member between the forward end of the capsule and the abutment means. The capsule is surrounded by a chamber defined by wall means formed in the frame. A predetermined impact load on the bumper causes the capsule to elastically and plastically deform in a radially outward manner such that upon contacting the chamber walls a permanent set corrugated-like undulation is formed resulting in the dissipation of impact energy. The coil spring expands to accommmodate the reduced length of the capsule thereby returning the bumper to its original position. After a plurality of impacts the deformed capsule may be replaced enabling all other components of the mount to be reused.

5 Claims, 8 Drawing Figures

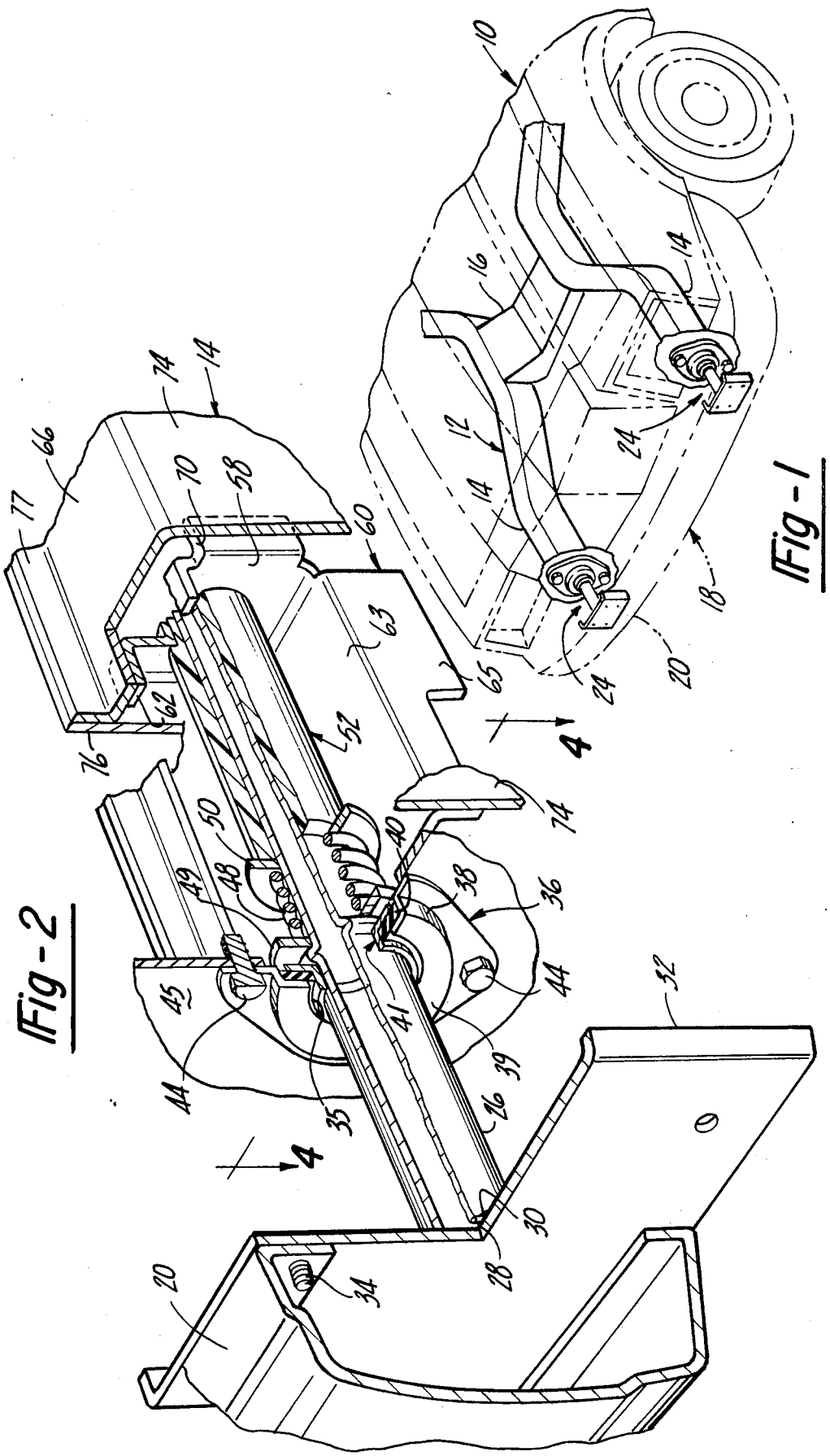

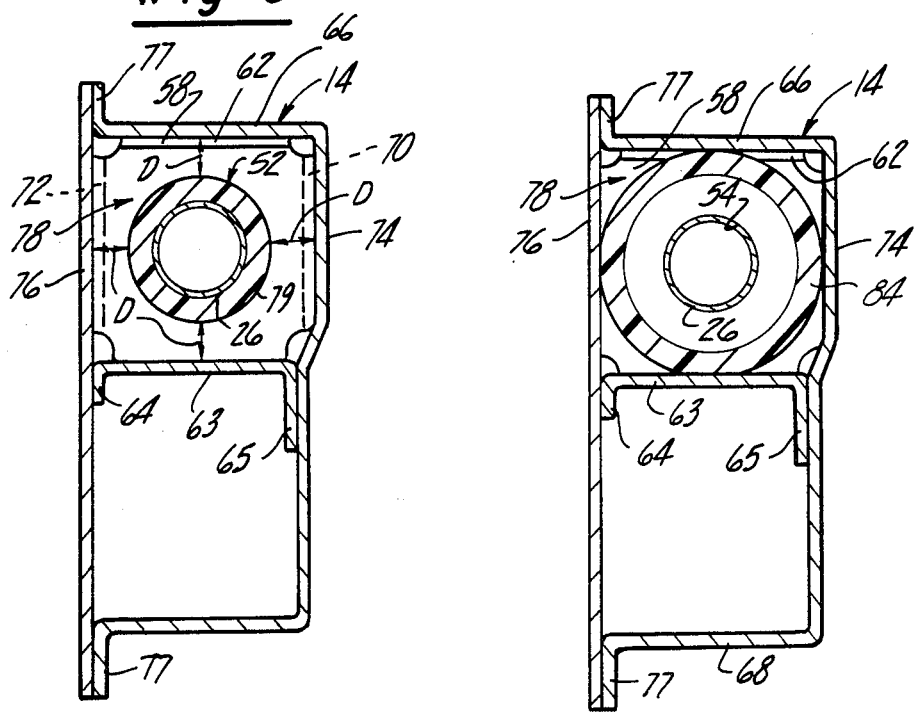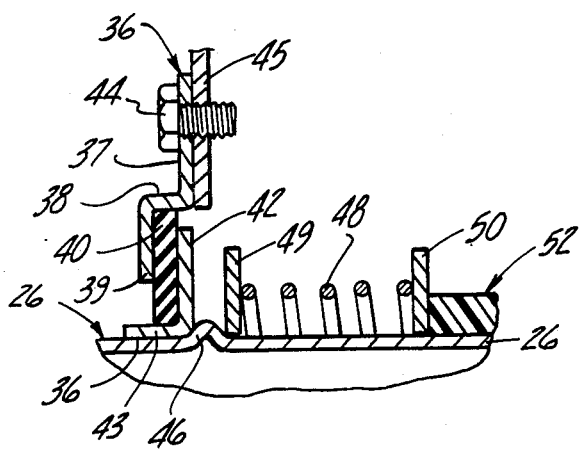

SELF-RESTORING ENERGY ABSORBING BUMPER MOUNT

BACKGROUND OF THE INVENTION

The present invention relates to a bumper mount, and more particularly to an energy absorbing bumper mount for an automobile.

Energy absorbing bumper mounts for automotive vehicles are well known in the art. Examples of such a shock absorbing bumper mounts are found in U.S. Pat. Nos. 3,715,114, 3,715,139, 3,752,462, 3,804,446 and 4,200,318. Some of these units have inner and outer concentric cylinders or the like that are movable from an extended position to a telescoped position in response to the application of predetermined impact loads on the bumper assembly. Various energy absorber mediums such as viscous fluid spring devices or elastomeric cylindrical capsules, for example, have been used in conjunction with the telescoping cylinders. While these energy absorbing devices have adequately performed in absorbing impact energy, they are complicated, costly, and difficult to service while adding objectional weight to the vehicle.

BRIEF SUMMARY OF THE INVENTION

Accordingly, a primary feature of this invention is to provide an improved energy absorber mount that has an increased absorption capability while being relatively simple in construction and reliable in operation. Another feature of this invention is that it provides an improved energy absorbing bumper mount of the telescopically collapsible type which allows for adequate energy dissipation without damage to the vehicle and without the need to replace the bumper mounts. Still another feature of the invention is to provide an improved energy absorbing bumper mount having a minimum number of fasteners, components and welds.

A load bearing tube member is preferably made from a seamless length of steel tubing formed with a small expansion crimp or annular abutment. The abutment may be readily formed at a forward location on the tube member by a pipe die, for example. A reaction coil spring surrounds the tube such that the springs forward end is retained by the abutment and the springs rearward end is retained by an energy absorbing capsule. The coil spring is initially compressed under a set preload and held in positive contact between the abutment and the forward end of the capsule. In the preferred form the capsule is made from a thermoplastic polyester elastomer of the type, for example, manufactured by the E. I. du Pont de Nemours and Company (Inc.) under the trademark HYTREL.

The capsule is a cylindrical shaped member having a central bore that allows for its telescopic reception on the aft portion of the tube member. The capsule extends longitudinally a predetermined axial distance between the vehicle end of the coil spring and transverse wall means fixedly secured to a portion of the vehicle frame. A predetermined impact force acting on the vehicle bumper results in the capsule being strained causing it to geometrically deform or take a permanent set providing one or more corrugated-like undulations. The bumper mount inner portion is located within a longitudinally extending box-sectioned vehicle frame portion having four rectangularly disposed wall portions defining a chamber having a predetermined square cross section. In response to a predetermined collision force the chamber four wall portions cooperate with the outwardly expanding capsule to limit or restrict its radial expansion. This capsule expansion dissipates impact energy as a result of the formation of the permanently strained undulation.

The reduction in the overall axial length of the permanently deformed capsule is accommodated by a corresponding expansion of the preloaded coil spring restoring the bumper to its original position. If the bumper subsequently receives a second impact the elastomeric capsule is designed to undergo further controlled geometric deformation by buckling into a second permanent corrugated-like undulation longitudinally spaced from the first corrugated-like undulation. It will be appreciated that the surrounding chamber walls are designed to restrict the capsule expansion thereby preventing the capsule from being subjected to uncontrolled buckling and resultant failure. Thus, even after multiple impacts the spring allows it to further expand and restore the bumper to its original position.

In the bumper system of the disclosed embodiment, for example, the mount is capable of absorbing one or more 5 m.p.h. impact load without damage to the bumper or the mount metal support components. Upon extensive capsule buckling, caused either by a single major collision impact load or several minor collision impact loads, the spring may be unable to restore the bumper to its pre-impact position. In this case the bumper mount is readily removed and the deformed capsule replaced on the tube member enabling all other components of the mount to be reused.

BRIEF DESCRIPTION OF THE DRAWINGS

The above and other related objects and features of the invention will be apparent from a reading of the following description of the disclosure formed in the accompanying drawings wherein:

FIG. 1 is a perspective view of an automotive vehicle chassis frame showing a pair of energy absorbing bumper mounts arranged in connection between the vehicle frame and a bumper assembly;

FIG. 2 is an enlarged perspective view of one of the mounts having parts broken away and in section showing the mount in condition for impacting;

FIG. 6 is an enlarged vertical sectional view taken on line 6—6 of FIG. 4;

FIG. 7 is a view similar to FIG. 6 taken on line 7—7 of FIG. 5; and

FIG. 8 is an enlarged fragmentary sectional view of the center bracket resilient mounting arrangement.

DETAILED DESCRIPTION OF THE INVENTION

Figure 3:
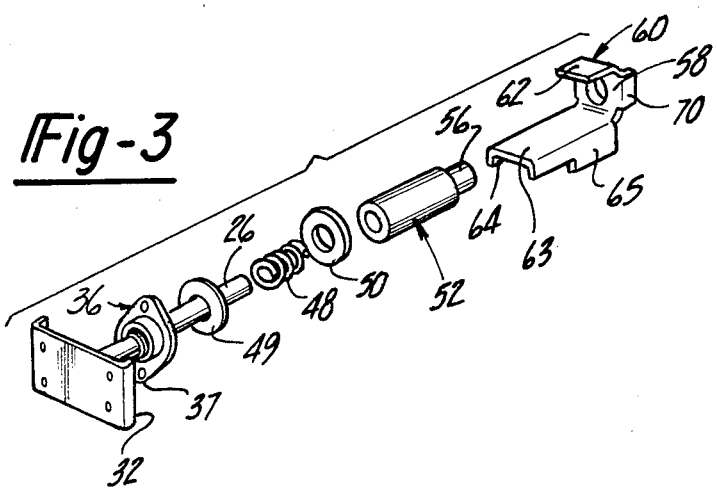
FIG. 3 is an exploded perspective view of one of the mounts.

Referring now to FIG. 1 of the drawings, there is shown in simplified form a front portion of a vehicle 10 including part of its chassis frame 12. The frame 12 comprises a pair of longitudinally extending generally U-sectioned side rails 14 (FIG. 6) being interconnected at the forward end of the frame by suitable rigid crossmembers 16. A front collision bumper structure 18, including a bumper bar 20 is shown in FIG. 2 supported on the frame side rails by a pair of identical energy absorbing support units, generally designated at 24.

As seen in FIG. 2 each collision bumper unit 24 includes a cylindrically shaped hollow tubular member or support tube 26, which in the preferred form is a seamless steel tube, that extends substantially parallel to the longitudinal axis of the vehicle. The tubular member 26 has its forward end 28 suitably secured as by welding 30 to a bumper fixture 32. The right-hand and left-hand fixtures, 32 support the bumper structure 18 by suitable means such as bolts 34 threadably received in flanges of the bumper 20.

Figure 4:
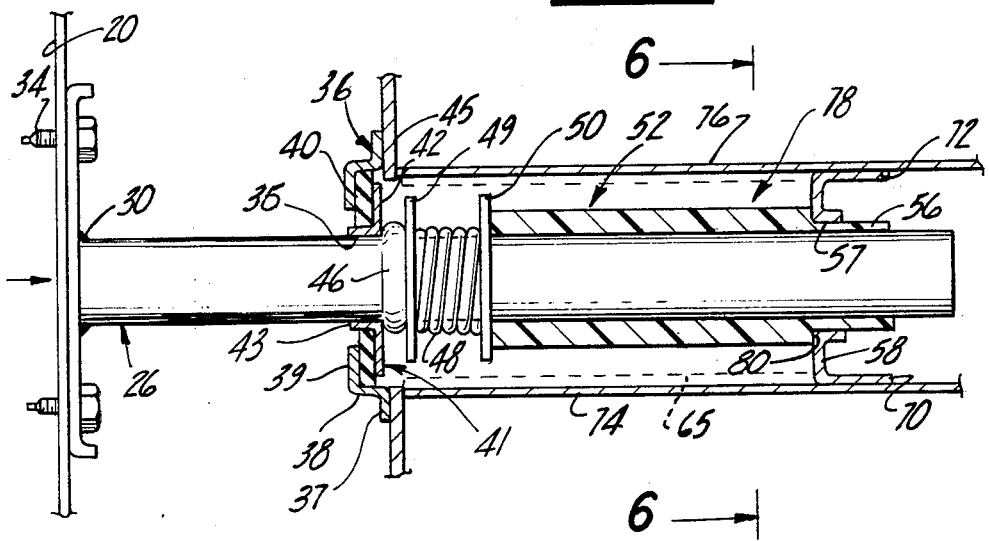
FIG. 4 is a fragmentary top elevational view taken substantially on line 4—4 of FIG. 2, partly in section, of the mount of FIG. 1.

FIG. 4 shows the tubular member 26 extending through a circular opening 35 in intermediate wall means in the form of a center bracket assembly 36. The opening 35 is sized to closely surround the tubular member 26 allowing axial travel of the tube relative to the bracket assembly 36. In the disclosed form the opening 35 is provided in a forwardly extending cup-shaped depression formed in bracket plate 37 of the center bracket assembly 36. As best seen in FIG. 8 the bracket plate cup-shaped depression is defined by an annular forward flange portion 38 and a radially inward flange portion 39. The plate cup-shaped depression is adapted to fixedly receive a resilient doughnut-shaped rubber isolation bushing 40 including an inner L-sectioned washer suitably bonded to the bushing. The L-sectioned washer 41 has an outwardly extending radial flange portion 42 which with the inwardly extending radial flange portion 39 sandwich the isolation bushing 40 therebetween. The washer 41 includes a forwardly extending sleeve 43 defining the circular opening 35. The center bracket assembly provides a tuned bumper mounting system of the type described in the U.S. Pat. No. 4,465,312 issued Aug. 14, 1984, and assigned to the assignee of the present application.

As seen in FIGS. 2 and 4 the center bracket 37 is fixedly secured by bolts 44 to a vertically extending face flange 45 formed integral with the forward end of its associated side rail 14. To prevent forward travel of the tubular member 26 in the opening 36 the tube is formed with intermediate shoulder means. In the preferred embodiment the tubular member 26 has an outwardly directed circumferential radial expansion or crimp 46 formed therein by suitable means such as a pipe die, for example.

With reference to FIG. 2 there is shown an open coil helical compression or restoring spring 48 surrounding the support tube 26. The spring 48 is positioned under compression between a pair of fore and aft thrust washers 49 and 50 respectively, so as to exert a continuing force against each washer. In the disclosed form the spring 48 has a predetermined rating of about 100 pounds and is maintained under a constant pre-load of about 500 pounds.

FIGS. 2, 3 and 4 show an energy absorbing cylindrical capsule 52 located adjacent the aft end of the tubular member 26. The capsule 52 is in the form of a thermoplastic elastomer hollow tube which in the preferred embodiment is molded from a polyester elastomer material produced by the E. I. DuPont de Nemours and Company (Inc.), Elastomer Division, under the trademark HYTREL. Elastomer plastics, such as the HYTREL polymer, feature low hysteresis under high impact, excellent compressive strength to withstand high load deformation, low crimp set, while remaining functional at temperature extremes. An important feature of applicant's invention is the use of a capsule 52 formed from a polyester elastomer which will yield, when strained, so as to take some permanent set. As will be explained below, applicants have devised a unique bumper mount structure which utilizes the elastic response and permanent setting characteristics of such thermoplastic elastomer materials. FIG. 4 shows the capsule 52 formed with a central annular passage 54 sized to slidably receive the tubular support member 26 therein. The capsule is shown in FIG. 4 having a reduced diameter collar portion 56 formed on its inner or vehicle end sized to be received in a flanged opening 57 provided in transverse vertical wall portion 58 of guide bracket member 60.

As best seen in FIG. 2 and 3, the guide bracket member 60, preferably formed from flat sheet steel, has an upper forwardly extending shoulder flange 62 and a lower forwardly directed foot flange 63 lanced therefrom. The upper flange 62 is suitably affixed, as by welding, to the inner surface of horizontal upper wall portions 66, (FIG. 6) of the frame side rail 14. The guide bracket 60 has a pair of symmetrical inboard and outboard vertically disposed wing flanges 70 and 72 extending longitudinally from transverse wall portion 58. The inboard wing flange 70 is adapted to be fixedly secured as by welding to its associated bight wall portion 74 of the side rail 14. As shown in FIG. 6 of the disclosed form the right-hand side rail 14 has a generally U-shaped cross-section with its open side facing outwardly. The side rail 14 open side is closed by a plate member 76 suitably secured, as by welding to the side rail upper and lower longitudinal flanges 77 formed from side rail wall portions 66 and 68, respectively. It will be seen in FIG. 6 that outboard wing flange 72 is similarly welded to the inner surface of plate 76. The lower foot flange 63 is shown formed with longitudinal inboard and outboard side flanges 65 which are welded to the inner faces of bight wall portion 74 and plate 76, respectively.

As seen in FIG. 4 the reduced diameter collar portion 56 defines an annular shoulder 80 which abuts the transverse wall portion 58 to position the capsule principal axis in longitudinal alignment with the side rail. Thus, upon the energy absorbing mount 24 being preloaded with the shoulder 80 abutting the wall portion 58 the reduced diameter collar portion 56 provides positive longitudinal positioning of the capsule 52 during the telescoping movement of the tubular member 26 to its dashed line position shown in FIG. 4 on the stroking of the bumper 18. It will be appreciated that the collar portion 56 also provides an integral spacer operative for isolating the metal support tube 26 from the metal wall portion 58 thus serving as a sound deadener.

Upon the bumper 18 colliding with a resisting object, the preloaded coil restoring spring 48 is compressed a minimal distance after which the energy absorbing capsule 52 is loaded in axial compression by the impact force. The force is transmitted from the shoulder 46 to the thrust washer 49 and thence by the fully compressed spring 48 to the thrust washer 50 and the capsule causing the tubular member 26 to be moved rightwardly as indicated by its phantom line position in FIG. 5. As the coils of the restoring spring 48 are preloaded, so as to be closely adjacent, the spring 48 has a minimal shock absorbing effect during the impact stroke on the mounts 24.

With reference to FIG. 6 it will be seen that the capsule 52 extends longitudinally within the confines of a substantially square cross-sectioned chamber 78 defined by the side rail upper wall portion 66, bight wall portion 74, plate wall portion 76, and lower foot flange 64. Thus, at four ninety degree locations the periphery 79 of the capsule is spaced at substantially equal minimal dimensions "D" from the four side wall portion 62, 64, 74 and 76. In the disclosed embodiment the capsule 52 has an outer diameter of about 50 millimeters, an inner diameter of about 34 millimeters and an overall length from its front end to its rear shoulder 80 of about 127 millimeters. The minimal dimension "D" is of the order of 5 millimeters for the preferred form of the invention.

Figure 5:
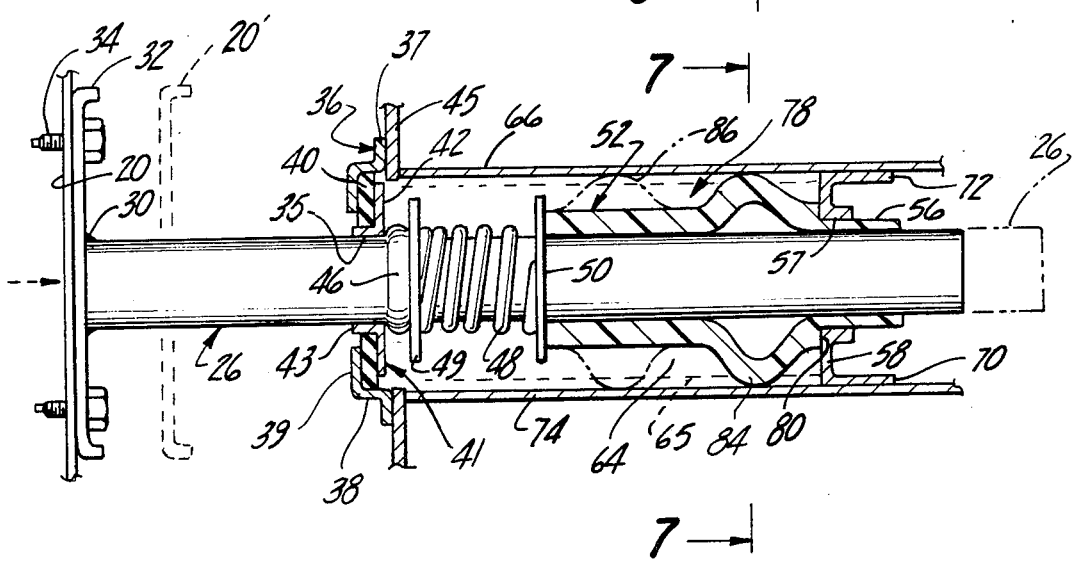
FIG. 5 is a top elevational view similar to FIG. 4 showing the mount after receiving an initial impact.

Upon the application of the impact load to the bumper 18, the bumper will be moved inwardly relative to the frame 12 and the body work. In the disclosed form the impact load causes the bumper fixture to be moved a determined distance to its dashed-line position 20' shown in FIG. 5. The tubular member 26 is moved an equal distance to its dashed-line position 26' guided by the circular opening 36 and the central annular passage 54 of the capsule. During the inward travel of the tubular member 26 the capsule 52 will be axially compressed between the thrust washer 50 and the wall portion 58. As a result, the capsule 52 geometrically deforms radially outwardly in a controlled symmetrical manner in the square cross-sectioned chamber 78. Because of the restriction of the four wall portions 62, 63, 74 and 76, the capsule 52 forms a doughnut-shaped convolute portion 84 adjacent the transverse wall portion 58. The capsules controlled deformation dissipates a predetermined level of impact energy sufficient to protect the vehicle body work from damage. In the event of a predetermined axial impact force on the bumper the capsule 52 undergoes combined axial and radial loads. This causes a strained permanent plastic deformation of the elastomeric material resulting in the convolute portion 84 as shown in FIG. 5.

On removal of the impact load, the bumper 18 will return to its original position under the restoration force of the preloaded restoring coil spring 48. As seen in FIG. 5 the restoring spring 48 expands a distance equal to the amount of axial foreshortening or reduction of the capsule caused by the permanent set of the convolute portion 84, thus maintaining a preload on the capsule 52.

An important feature of the present invention resides in having the capsule convolute portion 84 radial expansion constrained within the square-sectioned chamber 78. As a result, upon the application of a subsequent impact force on the bumper, a second controlled convolute portion indicated in phantom at 86, will be created in a spaced longitudinal location, such as adjacent the leftward end of the capsule 52. In a similar manner the restoring spring 48 will further expand to accommodate the additional axial reduction of the capsule caused by the permanent formation of the second convolute portion 86. The bumper will thus be restored to its original position.

It is to be understood that, if the bumper 10 receives an impact load less than a predetermined value, such as a 5 m.p.h. impact, the capsule 52 is designed to resiliently dissipate the impact energy obviating any permanent plastic deformation or set. That is, the capsule 52 will return to its original cylindrical shape in the manner of high-strength rubber material.

It will be understood that the chamber 78 could have other cross-sectional configurations than the square cross-section defined by the four wall members 63, 66, 74 and 76 in FIG. 6. For example, the chamber could have longitudinal wall means defining a polygonal cross-section with equal line segments (i.e., an equilateral triangle, square, pentagon, etc.) or a circular cross-section. In either case, the determining factor is that the periphery of the capsule is spaced a predetermined minimal distance "D" from the chamber wall means. This arrangement is achieved by having the longitudinal principal axis of the capsule coincident with the axis of the symmetry of the chamber 78.

Although only one embodiment of the subject invention has been illustrated and described, modifications and variations of will readily come to mind of a person skilled in the art which modifications and variations do not fall outside the scope of the invention as defined hereinafter.

What is claimed is:

1. An energy-absorbing mount for mounting a bumper assembly to a support frame of an automobile comprising;

a longitudinally extending vehicle frame portion formed with an inner wall having a circular opening with its center aligned on a longitudinal axis;

a longitudinally extending tubular member having its forward portion adapted to be secured to a vehicle bumper assembly and its aft portion adapted to be slidably supported in said inner wall circular opening with said tubular member aligned on said axis;

said frame portion having intermediate wall means defining an aperture receiving an intermediate portion of said tubular member therethrough;

abutment means on said tubular member adapted to engage said intermediate wall means preventing forward travel of said tubular member;

a cylindrical capsule of compressible thermoplastic polyester elastomer material having a central passage telescopically receiving said tubular member aft portion therethrough, said capsule having its aft end adapted to abut said inner wall and extending forwardly so as to be axially spaced a predetermined distance from said abutment means;

coil compression spring means concentrically disposed about said tubular member intermediate the forward end of said capsule and said abutment means, said spring means exerting an axially compressive preload force biasing said bumper assembly into its outboard pre-impact position, said frame portion including longitudinally extending wall means defining a chamber adapted to surround said capsule in a symmetrical manner, said chamber wall means spaced from the outer periphery of said capsule so as to restrict the radial expansion of said capsule to a predetermined minimal radial distance, whereby in response to the application of a predetermined impact load on said bumper causing said capsule to elastically and plastically deform in a radially outward geometric manner such that upon contacting said chamber wall means a permanent corrugated-like undulation is formed thereby dissipating the impact energy, and wherein said capsule being permanently reduced in its overall axial dimension as a result of said undulation such that said spring means expands to accommodate said reduced axial dimension thereby biasing said bumper to its original pre-impact position.

2. An energy-absorbing mount for mounting a bumper assembly to a support frame of an automobile comprising;

- a longitudinally extending vehicle frame portion formed with an inner transverse wall having a circular opening with its center aligned on a longitudinal axis;
- a longitudinally extending tubular member having its forward portion adapted to be secured to a vehicle bumper assembly and its aft portion adapted to be slidably supported in said inner wall circular opening with said tubular member aligned on said axis;
- said frame portion having intermediate wall means defining an aperture receiving an intermediate portion of said tubular member therethrough;
- abutment means on said tubular member having a radial crimp formed therein adapted to engage said intermediate wall means preventing forward travel of said tubular member;
- a cylindrical capsule of compressible thermoplastic polyester elastomer material having a central passage telescopically receiving said tubular member aft portion therethrough, said capsule having its aft end adapted to abut said inner wall and extending forwardly so as to be axially spaced a predetermined distance from said abutment means;
- a coil compression spring concentrically disposed about said tubular member intermediate the forward end of said capsule and said radial crimp, said spring exerting an axially compressive preload force biasing said bumper assembly into its outboard pre-impact position,
- said frame portion including four longitudinally extending wall portions defining a substantially square-sectioned chamber adapted to surround said capsule in a symmetrical manner, each said chamber wall portion spaced a predetermined minimal distance from the outer periphery of said capsule so as to restrict the radial expansion of said capsule;
- whereby in response to the application of a predetermined impact load on said bumper causing said capsule to elastically and plastically deform in a radially outward manner such that upon contacting said four chamber wall portions a permanent corrugated-like undulation is formed thereby dissipating the impact energy, and wherein said capsule being permanently reduced in its overall axial dimension a certain length as a result of said undulation such that said spring expands to accommodate said reduced axial dimension thereby biasing said bumper to its original pre-impact position.

3. The energy absorbing mount as set forth in claim 2 wherein said capsule being formed of HYTREL polyester elastomer material.

4. The energy absorbing mount as set forth in claim 2 wherein said capsule having a reduced diameter collar portion formed on its inner end defining an annular shoulder, said collar portion extending through said circular opening such that said annular shoulder abuts said inner wall and said collar portion providing an integral spacer operative for isolating the tube member from said inner wall.

5. The energy absorbing mount as set forth in claim 2 wherein said intermediate wall means in the form of a center bracket assembly having a bracket plate formed with a cup-shaped upwardly extending depression; said bracket assembly further comprising a resilient doughnut-shaped isolation bushing having an inner L-sectional washer in flush contact with an outward radial flange portion of said L-sectioned washer, such that said isolation bushing is sandwiched between said bracket plate and said outwardly radial flange providing a tuned mounting for the bumper assembly, and said L-sectioned washer including a forwardly extending sleeve defining said circular opening telescopically supporting said tube member therein.

* * * * *